United States Patent [19]

Shibuya et al.

[11] Patent Number: 4,644,391
[45] Date of Patent: Feb. 17, 1987

[54] IMAGE INFORMATION INPUT APPARATUS FOR INPUTTING SUPPLEMENTAL INFORMATION TO A COPYING MACHINE

[75] Inventors: Kunihiro Shibuya, Yokohama; Kunio Hara, Chiba, both of Japan

[73] Assignee: Kabushiki Kaisha Toshiba, Kanagawa, Japan

[21] Appl. No.: 745,950

[22] Filed: Jun. 18, 1985

[30] Foreign Application Priority Data

Jun. 29, 1984 [JP] Japan .............................. 59-134799

[51] Int. Cl.[4] .............................................. H04N 1/46
[52] U.S. Cl. ..................................... 358/75; 358/280; 358/293; 355/15
[58] Field of Search ................. 358/75, 280, 285, 293; 355/15

[56] References Cited

U.S. PATENT DOCUMENTS

| | | | |
|---|---|---|---|
| 3,588,322 | 6/1971 | Bartel | 358/280 |
| 3,941,558 | 3/1976 | Takiguchi | 432/75 |
| 4,340,295 | 7/1982 | Nakamura | 355/7 |
| 4,402,007 | 8/1983 | Yamada | 358/75 |
| 4,447,832 | 5/1984 | Kurata et al. | 358/293 |
| 4,486,786 | 12/1984 | Sato et al. | 358/293 |
| 4,546,381 | 10/1985 | Kurata et al. | 358/75 |
| 4,553,172 | 11/1985 | Yamada et al. | 358/75 |
| 4,554,592 | 11/1985 | Yoshida | 358/293 |

Primary Examiner—Henry C. Yuen
Attorney, Agent, or Firm—Schwartz, Jeffery, Schwaab, Mack, Blumenthal & Evans

[57] ABSTRACT

An image information input apparatus used for a copying machine and a facsimile apparatus, which comprises a support device for supporting an original thereon with a recording surface thereof up, a cover device for covering the original supported on the support device such that the cover device faces the recording surface of the original and a reading device for reading out the image information on the original through the cover device. The cover device has a surface capable of recording an additional image.

31 Claims, 7 Drawing Figures

IMAGE INFORMATION INPUT APPARATUS FOR INPUTTING SUPPLEMENTAL INFORMATION TO A COPYING MACHINE

BACKGROUND OF THE INVENTION

This invention relates to an image information input apparatus for digitally inputting image information used for a copying machine, a facsimile, or the like.

In an image information handling apparatus such as a copying machine or a facsimile, an original image is read and input as digital image information to the apparatus. The input digital image information is appropriately processed and used to transmit a copy of the original image, or reproduce a hard copy. In this type of apparatus, the original is set face down on a transparent platen, and the image information recorded on the original is optically read out from beneath the platen by a scanner.

In a conventional scanner, however, the original is liable to be placed on the platen on a slant so that the scanning operation is not precisely performed. Further, when it is desired to input supplementary image information with the image information of the original set on the platen, it is necessary to physically process the original by additionally recording the supplementary image information on the original or by merging a plurality of originals, so that the original is stained and damaged.

SUMMARY OF THE INVENTION

Accordingly, it is an object of the present invention to provide an image information input apparatus which may simultaneously input information for a plurality of images.

Another object of the invention is to provide an image information input apparatus which permits input of supplementary image information with original information without first physically processing the original.

The above and other objects are achieved by a novel image information input apparatus including means for supporting an original thereon with a recording surface of the original face up, means for covering the original supported on the supporting means such that the covering means faces the recording surface of the original. The covering means has a surface capable of recording an additional image, and means are provided for reading out the image on the original and the additional image recorded on the covering means.

BRIEF DESCRIPTION OF THE DRAWINGS

These and other objects and advantages of the invention will become more apparent and more readily appreciated from the following detailed description of the preferred embodiments of the invention taken in conjunction with the accompanying drawings, of which.

DETAILED DESCRIPTION OF THE PREFERRED EMBODIMENTS

Figure 1:
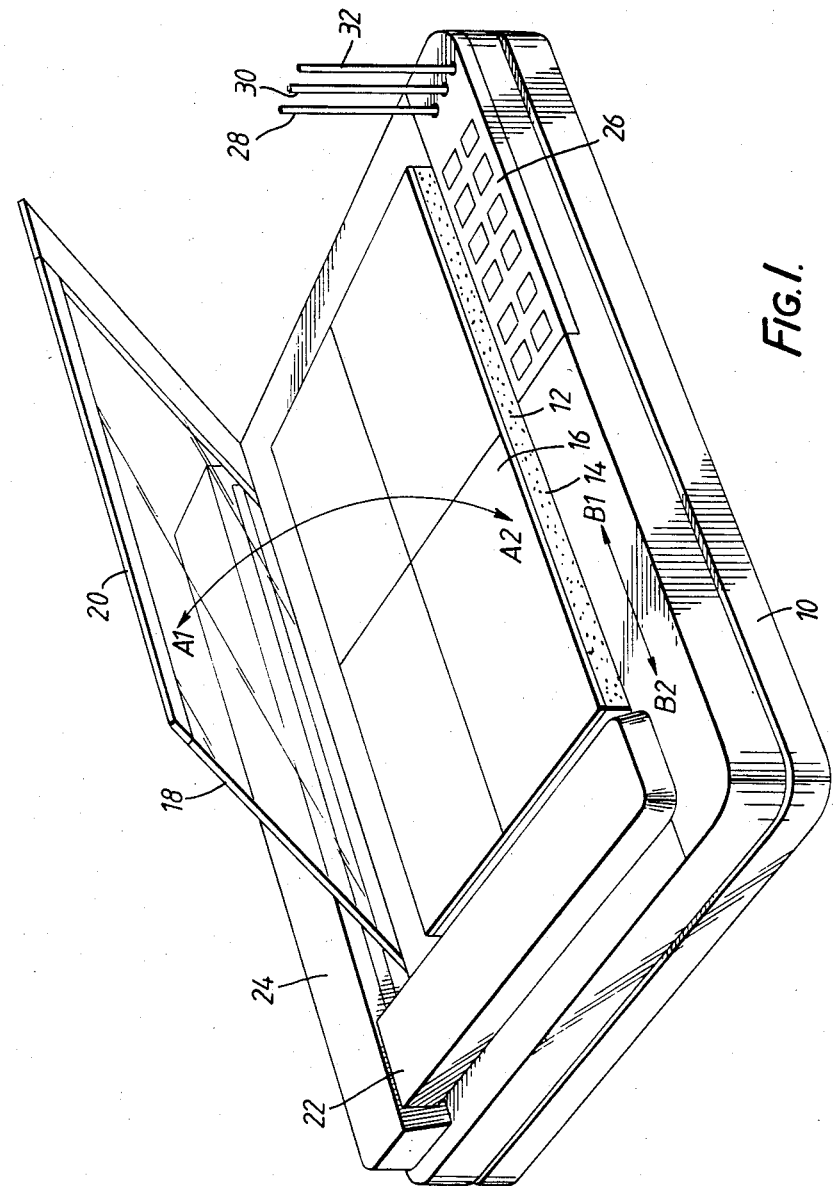
FIG. 1 is a perspective view of a scanner including an image information input apparatus according to the present invention.

FIG. 1 is a perspective view of a scanner applied to an image information input apparatus of a digital copier.

Referring to FIG. 1, the scanner comprises an original table 12 secured on a top of a casing 10. This original table 12 for supporting a original to be scanned consists of an elastic sheet 14 and a white sheet 16 which are bonded to each other and attached to the upper surface of casing 10. When a book or the like is placed on white sheet 16 with the cover of the book down so as to read out an image in the book, the unevenness of the underside of the book may be absorbed so that the upper surface of the book may be made flat. A transparent plate 18 to retain and cover the book is supported in a frame 20, which is hinged by a hinge (not shown) on the top of original table 12 so that it can be opened and closed in the direction of arrows A1 and A2. When transparent plate 18 is closed, it faces the information surface of the book set on original table 12. Transparent plate 18 consists of a polyethylene telephthalate sheet (for example, Lumira, a trade name by TORAY Co., Ltd.) with a thickness of 0.5 mm. In the case of a scanner having a long focal length, it is possible to use a glass plate or the like with a thickness of about 2 mm. A reading device 22 is provided on casing 10. This reading device 22 optically reads out image information of an original set on original table 12 and/or image information erasably recorded on the surface of transparent plate 18. Reading device 22 is supported and reciprocated in the direction of arrows B1 and B2 by a guide device 24. Casing 10 is provided with an operating panel 26. Felt pens including a red pen 28, a blue pen 30 and a black pen 32, are provided for erasably recording image information on the surface of transparent plate 18.

Figure 2:
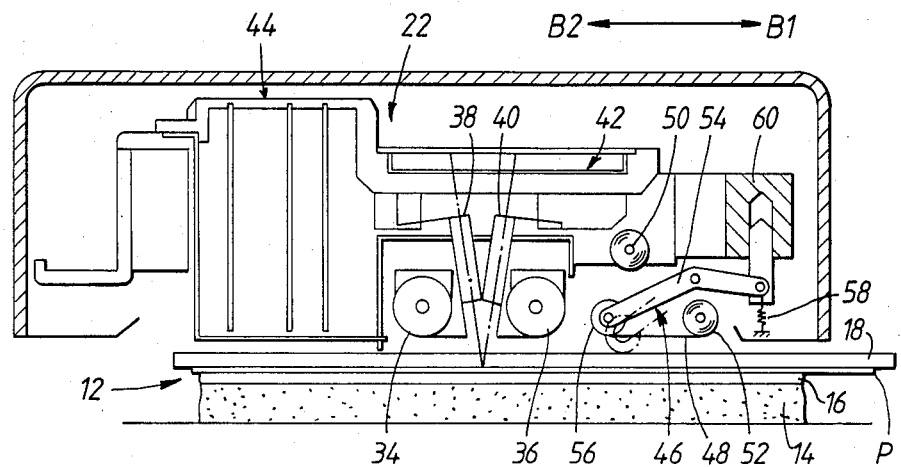
FIG. 2 is a side sectional view of the scanner shown in FIG. 1.

Referring to FIG. 2, showing the internal construction of reading device 22, there are shown light sources 34 and 36, e.g., two fluorescent lamps, for illuminating transparent plate 18, two lens arrays 38 and 40 for collecting light reflected from plate 18, a photoelectric converter 42 for generating image signals according to light collected by lens arrays 38 and 40, and a signal processing unit 44. A cleaner 46 is provided integral with reading device 22 for cleaning the surface of plate 18. This cleaner 46 comprises a belt-like non-woven cloth 48 saturated with liquid cleaning agent for cleaning the surface of plate 18 by rubbing, a feed roller 50 having a roll of non-woven cloth 48 wound thereon and a recovery roller 52 for taking up non-woven cloth 48 fed from feed roller 50. These rollers 50 and 52 are driven in the counterclockwise direction by a motor (not shown). Cleaner 46 is also provided with a lever 54 pivoted to a frame (not shown), a guide roller 56, a biasing member 58 and a plunger type solenoid 60. Guide roller 56 is pivoted at one end of lever 54, and non-woven cloth 48 between feed roller 50 and recovery roller 52 is passed in contact with guide roller 56. Biasing member 58 is coupled to the other end of lever 54 and applies a tensile force thereto. Solenoid 60 turns lever 54 counterclockwise against the biasing force of biasing member 58. This solenoid 60 may be energized for selectively cleaning the surface of plate 18 during forward movement of reading device 22 (i.e., movement in the direction of arrow B2 in FIG. 2).

Figure 3:
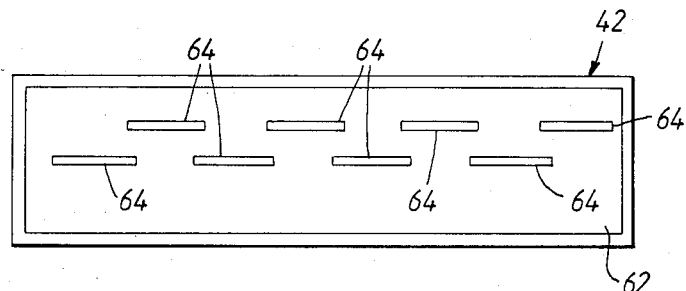
FIG. 3 is a plan view of a reading device of the scanner.
Figure 4:
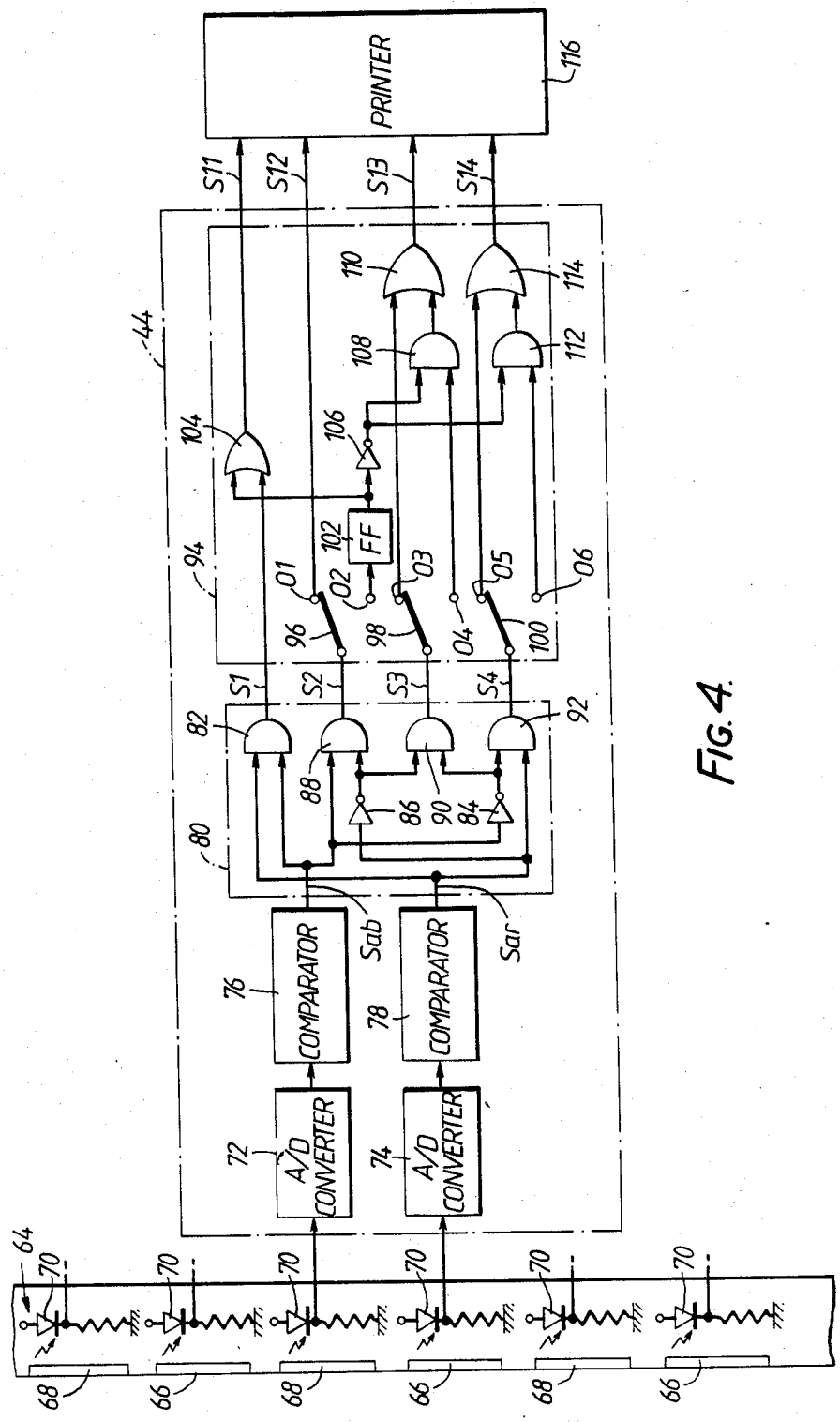
FIG. 4 is a block diagram of an electric circuit of the scanner.
Figure 5:
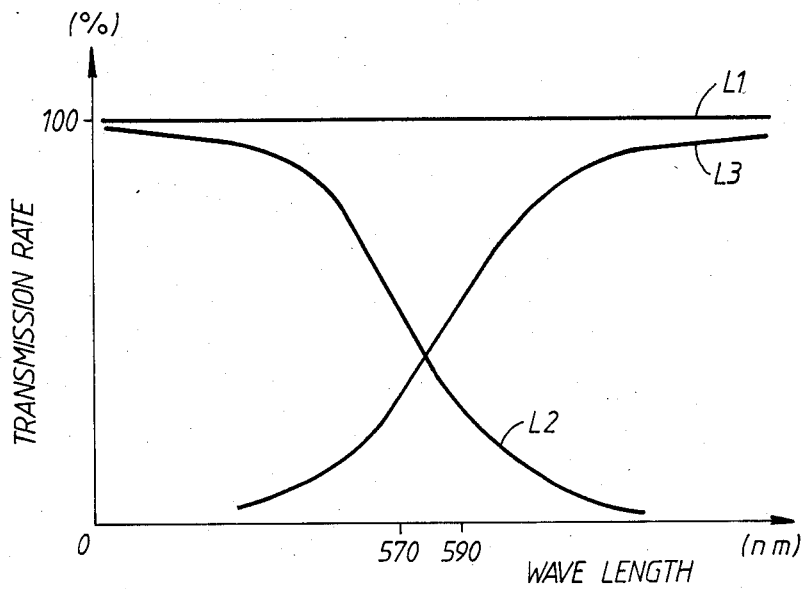
FIG. 5 is a graph showing characteristics of color filters of the scanner.

Referring to FIGS. 2 and 3, photoelectric converter 42 comprises a base plate 62 which faces lens arrays 38 and 40 and a plurality of photoelectric converting arrays 64, for example CCDs (charge coupled devices), are alternately arranged in parallel to one another. This structure permits the use of economical small length CCDs in combination. Photoelectric converting arrays 64 are alternately masked by two different color filters, e.g., a red filter 66 and a blue filter 68 as shown in FIG. 4, so that image signals are generated according to the wavelength of light reflected from plate 18. More specifically, red and blue filters 66 and 68 are alternately arranged on pairs of photoelectric elements 70 which define a pixel of photoelectric converting array 64, as shown in FIG. 4. Red filter 66 has a characteristic which transmits light of wavelengths according to a line L2 as shown in FIG. 5. Blue filter 68 has a characteristic which transmits light of wavelengths according to a line L3 as shown in FIG. 5. In FIG. 5, line L1 shows the relative value of natural light. Namely, blue filter 68 absorbs substantially all reflected blue light according to its characteristic, so that substantially no photoelectric conversion signal corresponding to the reflected blue light is provided from photoelectric converting element 70 covered by blue filter 68. Also, red filter 66 absorbs substantially all reflected red light according to its characteristic, so that substantially no photoelectric converting signal corresponding to the reflected red light is provided from photoelectric converting element 70 covered by red filter 66.

FIG. 4 shows the detailed circuit of signal processing unit 44. The illustrated circuit is provided for each pair of photoelectric converting elements 70 which are covered by red filter 66 and blue filter 68, respectively. Signal processing unit 44 is provided with A/D converters 72 and 74 and comparators 76 and 78. A/D converter 72 converts photoelectric signals of photoelectric converting element 70 covered by blue filter 68 into digital signals. Another A/D converter 74 converts photoelectric signals of photoelectric converting element 70 covered by red filter into digital signals. Comparators 76 and 78 are connected to A/D converters 72 and 74, respectively, and compare the digital signals of A/D converters 72 and 74 to preset threshold levels of red and blue level setters (not shown), so that comparator 76 generates a blue absorption signal Sab and comparator 78 generates a red absorption signal Sar.

These absorption signals Sab and Sar are provided to a color disassembler 80 which converts the digital signals Sab and Sar into color digital signals, e.g., a white signal S1, a red signal S2, and black signal S3, and a blue signal S4. This color disassembler 80 includes an AND gate 82 which receives the absorption signals Sab and Sar and provides the white signal S1, an inverter 84 which receives the blue absorption signal Sab and provides an inverted signal, an inverter 86 for inverting the red absorption signal Sar, an AND gate 88 which receives the blue absorption signal Sab and the inverted signal of inverter 86 and provides the red signal S2, an AND gate 90 which receives the inverted signals of inverters 84 and 86 and provides the black signal S3, and an AND gate 92 which receives the red absorption signal Sar and the inverted signal of inverter 84 and provides the blue signal S4.

These color signals S1, S2, S3 and S4 are provided to an eraser 94. This eraser 94 functions such that when additional information recorded on plate 18 is different from an original information recorded on an original document, it selectively erases the color signals S1, S2, S3 and S4 of the original information according to the additional information or it merges the original information and the additional information. Eraser 94 includes a selection switch 96 for switching the red signal S2 between terminals O1 and O2, a selection switch 98 for switching the black signal S3 between terminals O3 and O4, and a selection switch 100 for switching the blue signal S4 between terminals O5 and O6. These selection switches 96, 98 and 100 are ganged together. When these switches are thrown to the side of terminals, O1, O3 and O5, normal reading operation may be performed, in which the original information and/or the additional information may be read out. On the other hand, when switches 96, 98 and 100 are thrown to the side of terminals O2, O4 and O6, eraser 94 becomes operative, so that the original information encircled by the additional information is erased and the rest of the original information is read out. Eraser 94 also comprises a flip-flop 102 connected to terminal O2, an OR gate 104 for receiving the output of flip-flop 102 and the white signal S1 and providing a white color component signal S11, an inverter 106 for inverting the output of flip-flop 102, an AND gate 108 for receiving the output of inverter 106 and the black signal S3 from terminal O4, an OR gate 110 for receiving the output of AND gate 108 and the black signal S3 from terminal O3 and providing a black color component signal S13, an AND gate 112 for receiving the output of inverter 106 and the blue signal S4 from terminal O6, and an OR gate 114 for receiving the output of AND gate 112 and the blue signal S4 from terminal O5 and providing a blue color component signal S14. A red color component signal S12 is provided from terminal O1.

The color component signals S11, S12, S13 and S14 are fed to a printer 116 for information of an image based on these color component signals. Printer 116 may be a thermal transfer printer, an ink jet printer, a wire-dot printer or a laser beam printer.

The main functions of the scanner will now be explained.

Read-Out of Image Information

As shown in FIG. 2, an original P to be scanned is set on original table 12 with the surface carrying original image information, such as a picture, print and letters, upwards. After transparent plate 18 is closed to retain and cover original P, a command switch (not shown) provided on operating panel 26 is operated, so that reading device 22 is caused to move over transparent plate 18 in the direction of arrow B1 and to read out the original image information of original P. At this time, cleaner 46 is operative.

Namely, when solenoid 60 is energized in response to the operation of the command switch, lever 54 is turned so that non-woven cloth 48 is urged against transparent plate 18 by guide roller 56. As reading device 22 is moved in the direction of arrow B1 in FIG. 2, dust on transparent plate 18 and also images written thereon are wiped off by non-woven cloth 48. Since cleaner 46 is provided ahead of lens array 40, the wipe-off operation is performed prior to the read-out operation. Thus, unnecessary information left on transparent plate 18 is not read out. After the completion of the reading operation, reading device 22 is moved backwardly (in the direction of arrow B2 in FIG. 2) and solenoid 60 is deenergized, so that non-woven cloth 48 is held away from transparent plate 18. For the next cleaning operation, non-woven cloth 48 is slightly fed from feed roller 50.

The image information to be read out by reading device 22 is presented in the form of a contrast of at least two colors among the colors of white, red, black and blue including the background color of original P. As reading device 22 is moved gradually in the direction of arrow B1, original P is illuminated by fluorescent lamps 34 and 36, and the reflected light is coupled through lens arrays 38 and 40 to photoelectric converting array 64. In this way, each line of information of original P is successively read out in the direction of the scan of reading device 22. The light received by photoelectric converting array 64 is converted to signals for each pair of elements 70 covered by red and blue filters 66 and 68, respectively. The light, received by element 70 through blue filter 68, is converted to the blue absorption signal Sab, and the light received by element 70 through red filter 66, is converted to the red absorption signal Sar.

When the blue absorption signal Sab becomes a logic "1", the received light is assumed to be either red light or natural light reflected from a white plane. When the signal Sab becomes a logic "0", the received light is assumed to be either blue light or the color of non-reflected light from a black plane. When the red absorption signal Sar becomes a logic "1", the received light is assumed to be either blue light or natural light reflected from the white plane. When the signal Sar becomes a logic "0", the received light is assumed to be either red light or the color of non-reflected light from a black plane. Thus, when the red absorption signal Sar is a logic "1" and the blue absorption signal Sab is a logic "1", AND gate 82 outputs the white signal S1. When the blue absorption signal Sab is logic "1" and the red absorption signal Sar is logic "0", AND gate 88 outputs the red signal S2. When the blue absorption signal Sab is logic "0" and the red absorption signal Sar is logic "0", AND gate 90 outputs the black signal S3. When the blue absorption signal Sab is logic "0" and the red absorption signal Sar is logic "1", AND gate 92 outputs the blue signal S4.

In this way, color disassembler 80 separates the photoelectric conversion signals into four color signals of white, red, black and blue.

These color signals, S1, S2, S3 and S4 are fed to eraser 94. When selection switches 96, 98 and 100 are thrown to the side of terminals O1, O3 and O5, the signals S1, S2, S3 and S4 are directly output as the white, red, black and blue color component signals S11, S12, S13 and S14 to printer 116. Printer 116 forms an image on a recording medium according to the color component signals S11, S12, S13 and S14 provided from each signal processing unit 44.

Compiling of Image Information

Addition of Image Information

Now, the operation of reading additional image information with the original image information will be described.

First, original P is set on original table 12 with the surface carrying the original image up, and then original P is held by closing transparent plate 18. Then an additional image to be added to the original image is recorded on the surface of transparent plate 18 by felt pen 28, 30 or 32. Then, a command switch (not shown) provided on operating panel 26 is actuated to instruct the reading of the image including the additional image recorded on transparent plate 18, so that reading device 22 is reciprocated in the direction of arrows B1 and B2 to read out the image information. The reading operation is performed in the manner described above, and printer 116 forms images including the original image and the additional image according to the color signals S11, S12, S13 and S14. In this operation, in order to prevent the additional image from being wiped off prior to the scanning operation, the cleaning operation occurs in response to the operation of command switch only when reading device 22 is moved backwardly after the completion of scanning. In this way, the additional image may be read out together with the original image without first physically processing the original image above.

Deletion of Image Information

Figure 6:
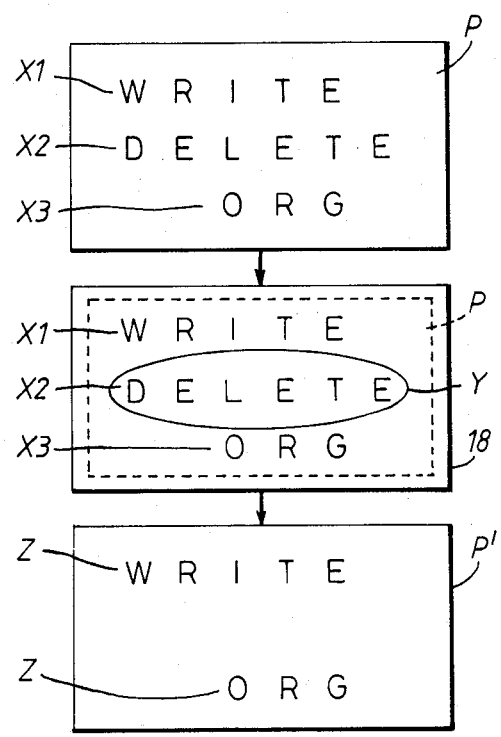
FIG. 6 shows an example of the delete mode of operation.

The deletion operation will now be described with reference to FIGS. 6 and 7. Original P is set on original table 12 with the recorded surface up, and is then held by closing transparent plate 18. The original P contains images X1, X2 and X3 on the recorded surface as shown in FIG. 6. These images X1, X2 and X3 are written in black on a white background. Then, an additional image Y which surrounds image X2 to be deleted, is written on the surface of transparent plate 18 in red using pen 28. This image Y need not be a closed loop so long as it surrounds image X2 to be deleted with respect to the direction of scanning movement of reading device 22, as will become apparent. Subsequently, a command switch (not shown) is actuated for instructing an operation mode wherein only the necessary part of the original image is read so that images X1 and X3 are read out and image X2 is deleted as reading device 22 is moved over transparent plate 18. In this operation, selection switches 96, 98 and 100 are thrown to the side of terminals, O2, O4 and O6 in response to the operation of the command switch. It is assumed that flip-flop 102 provides a logic "0" in its initial state. Thus, the black signal S3 and the blue signal S4 according to images X1 and X3 are input and the black color component signal S13 and the blue color component signal S14 are provided by the action of AND gates 108 and 112 and OR gates 110 and 114, so that original images X1 and X3 are read out. When the red signal S3 based on the additional image Y is input, the output flip-flop 102 is inverted, so that a logic "0" signal is input to AND gates 108 and 112. Thus, AND gates 108 and 112 constantly provide logic "0" signals, even if the black signal S3 or the blue signal S4 according to image X2 is produced. This means that logic "0" color component signals S13 and S14 are fed to printer 116. Therefore, the part of the original image encircled by image Y is deleted as shown in FIG. 6.

Figure 7:
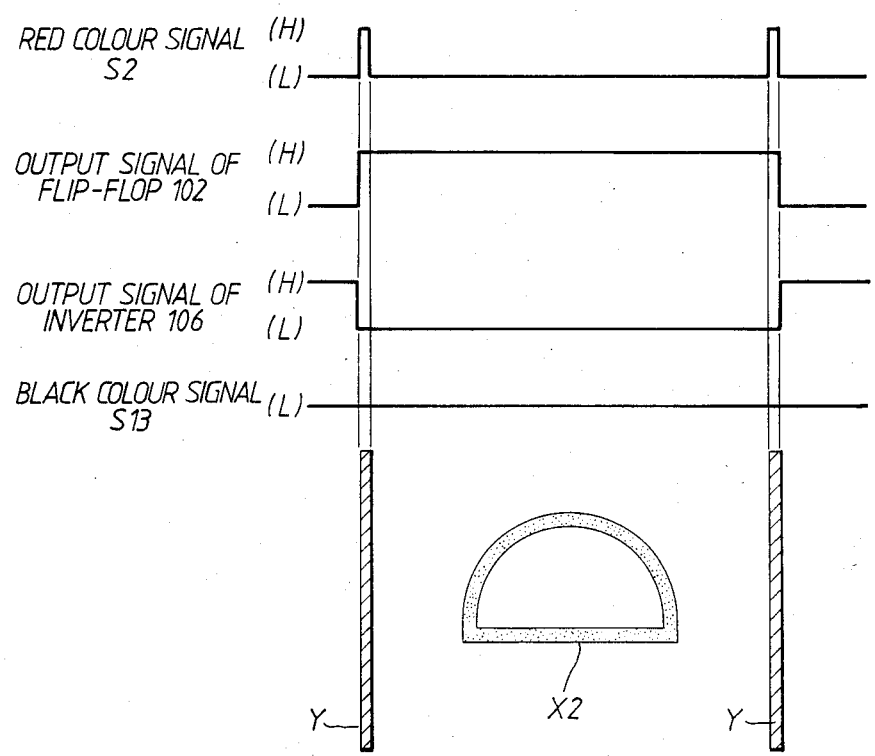
FIG. 7 shows a timing diagram useful for explaining the example of FIG. 6.

Referring to FIG. 7, the output signal of flip-flop 102 remains a logic "0" before the additional image Y is scanned. Once the additional image Y is scanned, the flip-flop 102 is set in response to the red color signal S2, so that the black color component signal S13 is maintained at logic "0". Therefore, the image X2 which is encircled by the image Y is deleted.

The red signal S2 according to the additional image is input to OR gate 104 through flip-flop 102. This signal S2 becomes a logic "0". As a result, an image according to this signal S2 is assumed to be white, i.e., the background of the original P. When the red signal S2 is produced again as shown in FIG. 7, flip-flop 102 outputs a logic "1" signal, so that the color component signals S13 and S14 are input to printer 116.

As a result, as shown in FIG. 6, image X2 which is encircled by image Y is deleted and printed images Z according to images X1 and X3 are formed on a recording medium P'. In this way, the output signals corresponding to the unnecessary information may be removed without any physical processing such as masking or erasing the original image.

As described above, the compiling of the images is performed by merely recording the additional image on the recording surface of transparent plate 18 using pen 28. Therefore, there is no need for providing a keyboard, a light pen or a mask for inputting an additional image and a display for confirming that additional information has been input.

The above embodiments have been described for the purpose of illustration, and various changes and modifications of the present invention are possible within the scope and spirit of the invention. For example, the image pick-up device is not limited to a scanner comprising a CCD array, and it may also be a television camera or the like. Further, a scanner according to the present invention may be connected in use to a facsimile apparatus, a copying machine or an image memory such as an optical disk.

What is claimed is:

1. An image information input apparatus comprising:
   means for supporting an original thereon with a recording surface of the original up;
   means for covering the original supported on said supporting means such that said covering means faces the recording surface of the original, said covering means having a surface for erasably recording an additional image; and
   means for simultaneously reading out the image on the original and the additional image recorded on said covering means.

2. An image information input apparatus according to claim 1, wherein said supporting means includes a deformable elastic member for forcing the original upwardly.

3. An image information input apparatus according to claim 1, wherein said supporting means includes a white sheet.

4. An image information input apparatus according to claim 1, wherein said supporting means comprises a deformable elastic member for forcing the original upwardly and a white sheet placed on said deformable elastic member for reflecting a light.

5. An image information input apparatus according to claim 1, wherein said covering means is movable between a first position where said covering means contacts the recording surface of the original and a second position where said covering means is spaced from the recording surface of the original.

6. An image information input apparatus according to claim 1, wherein said covering means includes a transparent plate.

7. An image information input apparatus according to claim 6, wherein said transparent plate is supported by a frame.

8. An image information input apparatus according to claim 1, wherein said covering means has a sufficient stiffness to retain the original.

9. An image information input apparatus according to claim 1, wherein said reading means is movable over said covering means.

10. An image information input apparatus according to claim 1, further comprising means for cleaning the surface of said covering means for recording said additional image.

11. An image information input apparatus according to claim 1 further including means for recording said additional image on said covering means surface.

12. An image information input apparatus according to claim 1 including means for distinguishing said additional image from said original image and selectively processing said additional image differently from said original image.

13. An image information input apparatus comprising:
    means for supporting an original thereon so that a recording surface of the original is set face up;
    means for covering the original supported on said supporting means such that said covering means faces the recording surface of the original, said covering means having a surface for erasably recording an additional image;
    means for optically scanning the image on the original and the additional image recorded on said covering means, said scanning means being adapted to output a signal according to the images scanned thereby, said covering means being positioned between said scanning means and said supporting means; and
    means for outputting digital image data according to the signal output from said scanning means.

14. An image information input apparatus according to claim 13, wherein said covering means is movable between a first position where said covering means contacts the recording surface of the original and a second position where said covering means is spaced from the recording surface of the original.

15. An image information input apparatus according to claim 14, wherein said scanning means is movable over said covering means being set at said first position.

16. An image information input apparatus according to claim 13, wherein said covering means includes a transparent plate.

17. An image information input apparatus according to claim 13, further comprising:
    means for merging the digital image data corresponding to the image on the original and the digital image data corresponding to the additional image recorded on said covering means.

18. An image information input apparatus according to claim 13, further comprising:
    means for deleting the digital image data corresponding to the image on the original in response to the digital image data corresponding to the additional image recorded on said covering means.

19. An image information input apparatus according to claim 13 further including means for recording said additional image on said covering means surface.

20. An image information input apparatus according to claim 13 including means for distinguishing said additional image from said original image and selectively processing said additional image differently from said original image.

21. An image information input apparatus comprising:

means for supporting an original having a recorded surface carrying an original image;

means for covering the recorded surface of the original such that said covering means contacts the recorded surface of the original, said covering means having a surface for erasably recording an additional image; and means for reading out the original image on the original through said covering means and the additional image recorded on said covering means.

22. An image information input apparatus according to claim 21, further comprising:

means for outputting digital image data according to the images read out by said reading means.

23. An image information input apparatus according to claim 22, further comprising:

means for merging the digital image data corresponding to the image on the original and the digital image data corresponding to the additional image recorded on said covering means.

24. An image information input apparatus according to claim 22, further comprising:

means for deleting the digital image data corresponding to the image on the original in response to the digital image data corresponding to the additional image recorded on said covering means.

25. An image information input apparatus according to claim 22, further comprising:

means for merging the digital image data corresponding to the image on the original and the digital image data corresponding to the additional image recorded on said covering means; and means for deleting the digital image data corresponding to the image on the original in response to the digital image data corresponding to the additional image recorded on said covering means; and means for selectively activating either merging means or deleting means to be operable.

26. An image information input apparatus according to claim 21, further comprising:

means for providing a set of color signals according to the images read out by said reading means; and means for deleting some of the color signals of the original image in response to the color signal of the additional image.

27. An image information input apparatus according to claim 21 further including means for recording said additional image on said covering means surface.

28. An image information input apparatus according to claim 21, including means for distinguishing said additional image from said original image and selectively processing said additional image differently from said original image.

29. An image information input apparatus comprising:

means for supporting an original having a recorded surface carrying an original image;

means for covering the recorded surface of the original such that said covering means faces the recorded surface of the original, said covering means having a surface for erasably recording an additional image in the form of an instruction image; and means for providing image data according to a part of the image of the original in response to the instruction image.

30. An image information input apparatus according to claim 29 further including means for recording said additional image on said covering means surface.

31. An image information input apparatus according to claim 29 including means for distinguishing said additional image from said original image and selectively processing said additional image differently from said original image.

* * * * *